(12) United States Patent
Arai

(10) Patent No.: US 7,135,131 B2
(45) Date of Patent: Nov. 14, 2006

(54) PROTON CONDUCTIVE MEMBRANE AND PRODUCTION METHOD THEREOF

(75) Inventor: Takuichi Arai, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 354 days.

(21) Appl. No.: 10/689,618

(22) Filed: Oct. 22, 2003

(65) Prior Publication Data

US 2004/0081823 A1 Apr. 29, 2004

(30) Foreign Application Priority Data

Oct. 23, 2002 (JP) .................. P. 2002-308885

(51) Int. Cl.
- *B32B 5/16* (2006.01)
- *B01D 61/42* (2006.01)
- *B01D 61/44* (2006.01)
- *H01M 8/10* (2006.01)
- *H01M 8/22* (2006.01)

(52) U.S. Cl. ............. 252/500; 252/518.1; 252/519.1; 428/331; 428/323; 429/30; 429/31; 429/33; 429/218.1; 429/302; 204/520; 204/515; 95/5

(58) Field of Classification Search ........... 252/518.1, 252/500, 519.1; 501/100; 423/118.1; 429/30, 429/33, 302, 31, 218.1; 204/520, 515; 502/4; 428/331, 323; 95/55; 422/211; 210/500.21

See application file for complete search history.

(56) References Cited

U.S. PATENT DOCUMENTS

| | | | | |
|---|---|---|---|---|
| 3,401,099 | A * | 9/1968 | McEvoy | 205/338 |
| 6,844,097 | B1 * | 1/2005 | Fukuda et al. | 429/33 |
| 6,864,006 | B1 * | 3/2005 | Honma et al. | 429/33 |
| 2002/0094466 | A1 * | 7/2002 | Kerres et al. | 429/33 |

FOREIGN PATENT DOCUMENTS

| | | | |
|---|---|---|---|
| DE | 199 19 881 A1 | | 4/1999 |
| DE | WO 00/77080 | * | 12/2000 |
| JP | 05254824 A | | 10/1993 |
| JP | 2001-307545 | | 11/2001 |
| JP | WO 02/15313 | * | 2/2002 |

OTHER PUBLICATIONS

M. Isayama et al., "Preparation of a Self-Supporting, Multilayered Film of Montmorillonite," *Chem. Letters*, pp. 1283-1286, 1993.

(Continued)

*Primary Examiner*—Mark Kopec
*Assistant Examiner*—Kallambella Vijayakumar
(74) *Attorney, Agent, or Firm*—Finnegan, Henderson, Farabow, Garrett & Dunner, LLP

(57) ABSTRACT

A proton conductive membrane according to the invention includes layered clay mineral powder which is a cation exchanger or an anion exchanger, and a crosslinking structure including an —O—SO$_2$—O— group which crosslinks particles of the layered clay mineral powder. The proton conductive membrane may be obtained by applying a modifying agent which contains one or more compounds selected from the group consisting of sulfuric acid and metal sulfates, to the layered clay mineral powder, each particle of the layered clay mineral powder having an acid site on a surface thereof. Thus, a phosphoric acid-derived compound which crosslinks the particles of the layered clay mineral powder is replaced by the sulfuric acid which is a stronger acid, whereby the proton conducting ability of the proton conductive membrane can be improved.

11 Claims, 1 Drawing Sheet

OTHER PUBLICATIONS

Poltarzewski, Z., et al., Novel proton conducting composite electrolytes for application in methanol fuel cells, *Solid State Ionics*, 119 (1999), pp. 301-304.

Translation of German Office Action dated Jan. 31, 2005.

* cited by examiner

PROTON CONDUCTIVE MEMBRANE AND PRODUCTION METHOD THEREOF

INCORPORATION BY REFERENCE

The disclosure of Japanese Patent Application No. 2002-308885 filed on Oct. 23, 2002, including the specification, drawings and abstract is incorporated herein by reference in its entirety.

BACKGROUND OF THE INVENTION

1. Field of the Invention

The invention relates to a proton conductive membrane and a production method thereof.

2. Description of the Related Art

As electrolyte material for a proton-exchange membrane fuel cell, polymer containing perfluorocarbon sulfonic acid such as Nafion (trademark) is widely employed. The electrolyte that constitutes a membrane-electrode assembly (hereinafter, referred to as an MEA) of the fuel cell needs to have proton conductivity and an ability to prevent crossover of reaction gases at both electrodes, that is, a gas-barrier property.

The polymer containing perfluorocarbon sulfonic acid such as Nafion has high gas permeability. Therefore, when the polymer containing perfluorocarbon sulfonic acid is used as the electrolyte membrane, there arise problems concerning a decrease in performance of the electrolyte membrane and durability of the electrolyte membrane. Further, there arises another problem that a distance between polymer chains of the polymer electrolyte is increased due to wetting during electric power generation, and the gas-barrier property deteriorates.

Accordingly, the inventor has focused attention on a thin film using clay mineral, as material having a high gas-barrier property. A layered clay mineral thin membrane is disclosed, which is produced by preparing a spreading solution containing layered clay mineral including an aluminum skeleton and a compound containing a phosphate group, spreading the spreading solution on a substrate, and then removing a solvent from a liquid membrane on the substrate (Japanese Patent Laid-Open Publication No. 5-254824, and M. Isayama Chem. Lett., 1283 (1993)).

However, the layered clay mineral thin membrane produced by the aforementioned production method has a low ion-exchange ability (that is, low proton conductivity). Therefore, the layered clay mineral thin membrane is not satisfactory material that can be used as the electrolyte membrane of the fuel cell.

SUMMARY OF THE INVENTION

It is an object of the invention to provide a proton conductive membrane which is made of a layered clay mineral thin membrane and which has an excellent gas-barrier property and excellent proton conductivity, and to provide a production method of the proton conductivity membrane.

The inventor has found that a crosslinking structure derived from sulfuric acid can be formed between particles of layered clay mineral powder, and has made the following invention.

A first aspect of the invention relates to a proton conductive membrane including layered clay mineral powder which is a cation exchanger or an anion exchanger, and a crosslinking structure including an —O—SO$_2$—O— group which crosslinks particles of the layered clay mineral powder.

Thus, the sulfuric acid which is a stronger acid than a compound containing phosphoric acid group crosslinks the particles of the layered clay mineral powder, whereby the proton conducting ability can be improved. Also, by using a compound having higher proton conductivity for crosslinking the particles of the layered clay mineral powder, gas permeability of the proton conductive membrane can be reduced while maintaining the proton conductivity.

A second aspect of the invention relates to a production method of a proton conductive membrane including a preparing step of preparing a spreading solution including layered clay mineral powder which is a cation exchanger or an anion exchanger and a modifying agent which contains one or more compounds selected from the group consisting of sulfuric acid and metal sulfates, a spreading step of spreading the spreading solution on a substrate such that a liquid membrane is formed, and a removing step of removing a solvent from the liquid membrane by drying.

In other words, the layered clay mineral powder is treated with sulfuric acid, whereby the particles of the layered clay mineral powder can be crosslinked by sulfuric acid having excellent proton conductivity. As a modifying agent, sulfuric acid and metal sulfates may be used. When a metal sulfate, particularly a strong alkali metal salt (sodium sulfate, potassium sulfate, or the like) is used as the modifying agent, a decrease in pH of the prepared spreading solution can be suppressed, and decomposition of the layered clay mineral powder can be suppressed.

BRIEF DESCRIPTION OF THE DRAWINGS

The foregoing and further objects, features and advantages of the invention will become apparent from the following description of preferred embodiments with reference to the accompanying drawing wherein.

DETAILED DESCRIPTION OF THE PREFERRED EMBODIMENTS

[Proton Conductive Membrane]

Figure 1:
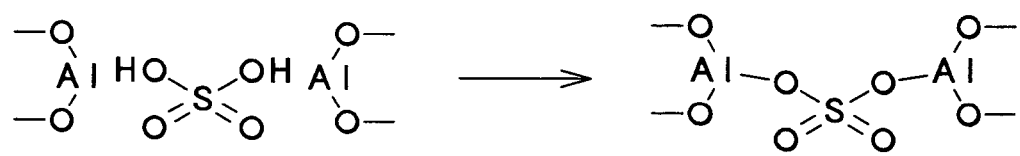
FIG. 1 is a diagram showing a crosslinking structure in which particles of layered clay mineral powder are crosslinked.

A proton conductive membrane according to an embodiment of the invention includes layered clay mineral powder and a crosslinking structure which crosslinks particles of the layered clay mineral powder. The layered clay mineral powder has a dense structure. In addition, since the layered clay mineral powder hardly swells due to wetting, the layered clay mineral powder has an excellent gas-barrier property. Since the particles of the layered clay mineral powder are closely crosslinked, the gas-barrier property of the crosslinked portion can be improved.

A form of the proton conductive membrane is not limited to a specific form, as long as the proton conductive membrane is in a membrane form. An appropriate size of the proton conductive membrane varies depending on a size of the MEA of the fuel cell. It is preferable that a thickness of the proton conductive membrane should be small, for example, approximately 10 to 100 μm, as long as a required strength and required gas-barrier property can be obtained.

The particle of the layered clay mineral powder is the cation exchanger or the anion exchanger. Examples of the cation exchanger include smectite, kaolinite, pyrophyllite, vermiculite, and acid clay. Examples of the anion exchanger include hydrotalcite. The particle of layered clay mineral powder has a structure in which basic skeletons including aluminum oxide and the like are stacked in layers. A form and a size of the particle of the layered clay mineral powder are not limited to a specific form and a specific size. However, it is preferable that the particle should be in a disc form or in a scaly form with a diameter of approximately 50 nm to 2 μm.

Examples of the crosslinking structure which crosslinks the particles of the layered clay mineral powder include an —O—$SO_2$—O— group. As shown in FIG. 1, the —O—$SO_2$—O— group can be formed by treating the layered clay mineral powder with sulfuric acid.

For example, the —O—$SO_2$—O— group can be formed by applying, to the layered clay mineral powder, a modifying agent which contains one or more compounds selected from the group consisting of sulfuric acid and metal sulfates. In this case, a surface of the particle of the layered clay mineral powder has an acid site with which a sulfate ion can react. The acid site will be described in detail later in description of a production method of a proton conductive membrane.

It is preferable that a sulfo group should exist on the surface of the particle of the layered clay mineral powder in order that the proton conductivity can be improved.

Subsequently, a specific property and a specific form of the anion exchanger used as the layered clay mineral powder will be described. It is difficult for the anion exchanger to have the proton conductivity as it is. Therefore, an anionic group needs to be introduced to the anion exchanger in order to give high proton conductivity to the anion exchanger. The anionic group to be introduced to the anion exchanger is preferably a strong acid, such as tungstosilicic acid, sulfuric acid, phosphoric acid, or heteropolyacid. Such a strong acid can be inserted between layers of the particle of the layered clay mineral powder. A method of inserting the strong acid between the layers will be described later in description of a production method of a proton conductive membrane.

Further, when the anion exchanger is employed as the layered clay mineral powder, phosphoric acid and/or a compound containing a phosphate group (for example, phosphorous acid: $H_3PO_4$, polyphosphoric acid: $H_{(n+2)}PnO_{3n+1}$ such as pyrophosphoric acid ($H_4P_2O_7$), an organic substance containing a phosphate group ($R_{3-n}PO(OH)_n$; n=1 or 2)) may be used for closslinking between the particles of the layered clay mineral powder.

[A Production Method of a Proton Conductive Membrane]

A production method of a proton conductive membrane includes a preparing step, a spreading step, a removing step, and another step that is added as required. According to the production method, the aforementioned proton conductive membrane can be produced.

(Preparing Step)

In the preparing step, a spreading solution is prepared. The spreading solution is spread such that a liquid membrane is formed in a spreading step that will be described later. The spreading solution includes layered clay mineral powder and a modifying agent which contains one or more compounds selected from a group constituting of sulfuric acid and metal sulfates. The modifying agent has properties of crosslinking particles of the layered clay mineral powder and introducing an ion exchange group that gives proton conductivity to a surface of the particle of the layered clay mineral powder.

The layered clay mineral powder is the same as the aforementioned layered clay mineral powder. It is preferable to use a metal sulfate instead of sulfuric acid itself, as the modifying agent. Particularly, it is preferable to use sodium sulfate, potassium sulfate, or the like which is a metal salt of a strong base. Thus, by using a salt of a strong acid and a strong base, a decrease in pH of the solution can be suppressed, and decomposition of the layered clay mineral powder in the spreading solution can be prevented. Particularly, sodium sulfate is preferable in terms of cost and reactivity. The solvent of the spreading solution is not limited to a specific solvent. For example, water, or a nonaqueous solvent such as alcohol may be used as the solvent.

An amount of the layered clay mineral powder dispersed in the solvent is not limited to a specific amount. However, approximately 10 to 100 g/L may be used. An amount of the modifying agent to be added is not limited to a specific amount. In the case of the layered clay mineral powder whose aspect ratio is 300, it is preferable to add approximately 1 to 100 millimoles of the modifying agent to 1 g of the powder. As the aspect ratio of the layered clay mineral powder decreases, the amount of the modifying agent to be added relatively increases. On the other hand, as the aspect ratio of the layered clay mineral powder increases, the amount of the modifying agent to be added relatively decreases. This is because the particle of the layered clay mineral powder is in a disc form, the acid site at an outer periphery portion of each particle in the disc form reacts with the modifying agent, and the particles of the powder are crosslinked at the outer periphery portions thereof. When the amount of the modifying agent to be added is in the aforementioned range, the particles of the layered clay mineral powder can be fully crosslinked, and an adverse effect of the modifying agent on the layered clay mineral powder can be minimized. The aspect ratio of the particle of the layered clay mineral powder is obtained by dividing a diameter of the disc by a thickness of the disc when the particle is assumed to be in the disc form.

When approximately 1 to 100 millimolles of the modifying agent is added to 1 g of the layered clay mineral powder, each particle of which has an aspect ratio of 300, the amount of the modifying agent becomes slightly excessive as compared with the number of acid sites on surfaces of the particles of the layered clay mineral powder, and a sulfo group can be introduced to the surface of the particle of the layered clay mineral powder.

Further, the preparing step may include a pH adjusting step and a modifying agent adding step. In the pH adjusting step, the layered clay mineral powder is dispersed in a solvent, and then pH of the solution is adjusted to a predetermined pH. The predetermined pH is alkaline, and is preferably approximately 8 to 12, and more preferably approximately 10.

By adjusting pH of the solution to the predetermined pH, it is possible to remove an impurity (silica glass or the like) in the layered clay mineral powder, and to suppress an adverse effect of the modifying agent that is added later on the layered clay mineral powder. A method of adjusting pH is not limited to a specific method. For example, the predetermined pH can be obtained by adding a solution (for example, an aqueous solution) in which an alkaline substance such as sodium hydroxide or potassium hydroxide is dissolved.

In the modifying agent adding step, the modifying agent is added after pH of the solution is adjusted to the predetermined pH, whereby a decrease in pH due to addition of the modifying agent can be suppressed.

(Spreading Step)

In the spreading step, the spreading solution is spread on a substrate such that a liquid membrane is formed. A thickness of the liquid membrane to be formed is determined such that a thickness of the proton conductive membrane that is finally required can be obtained, considering a concentration of the layered clay mineral powder contained in the spreading solution. Material of the substrate on which the spreading solution is spread is not limited to specific material. For example, glass, quartz, plastic (polystyrene, PTFE, polyethylene, or the like), graphite, ceramics, or stainless steel may be employed.

(Removing Step)

In the removing step, the solvent in the spreading solution that forms the liquid membrane is removed by drying, whereby a reaction in which the particles of the layered clay mineral powder are crosslinked proceeds.

As shown in FIG. 1, in the reaction in which the particles of the layered clay mineral powder are crosslinked by the modifying agent, the sulfate ion acts on the acid site on the surface of the particle of the layered clay mineral powder (in FIG. 1, the acid site is a portion of Al; a specific structure thereof is not shown) such that the portions of Al of both the particles are crosslinked. Also, sulfuric acid can be replaced by a sulfate. Although the portions of Al are crosslinked in FIG. 1, other portions may be crosslinked.

It is preferable that a speed at which the solvent is removed by drying should be slow such that the proton conductive membrane having stable properties can be formed. For example, when water is used as the solvent of the spreading solution, the proton conductive membrane having stable properties can be produced by drying the solution in a temperature range from room temperature to approximately 60° C. for approximately 24 to 72 hours. Then, preferably, the membrane is dried in an atmosphere in which the temperature is 25° C. and relative humidity is 50% for 3 days, and then the membrane is dried at the temperature of 60° C. for 3 to 12 hours so that the reaction in which the particles of the layered clay mineral powder are crosslinked proceeds more reliably and the thin membrane having stable properties can be obtained.

(Another Step)

When the layered clay mineral powder to which the production method is applied is the anion exchanger, it is preferable that the production method should include an immersing step of immersing the layered clay mineral powder in a strong acid solution before the preparing step. By immersing the layered clay mineral powder in the strong acid, the strong acid can be inserted between layers of the particle of the layered clay mineral powder. When the strong acid is inserted, the layered clay mineral powder which is the anion exchanger has sufficient proton conductivity.

Examples of a preferable strong acid include tungstosilicic acid, sulfuric acid, and phosphoric acid. It is preferable that the solvent used for the strong acid solution should be a nonaqueous solvent such that the degree of acidity of the strong acid is reduced, in order that an adverse effect of the strong acid on the layered clay mineral powder can be suppressed when inserting the strong acid between the layers of the particle of the layered clay mineral powder. Examples of a preferable nonaqueous solvent include alcohol such as ethanol or methanol. After the layered clay mineral powder is immersed in the strong acid solution, a soluble substance (a residual strong acid, or the like) can be removed by cleaning the layered clay mineral powder with an appropriate solvent.

Further, when the anion exchanger is employed as the layered clay mineral powder, phosphoric acid and/or a compound containing a phosphate group may be employed as the modifying agent.

EXAMPLES

Synthesis Examples 1 to 3

As the layered clay mineral powder, 0.25 g of smectite was added in 25 mL of ultra pure water, and was dispersed by an ultrasonic homogenizer. As a result, a homogenous suspension was obtained. While agitating the suspension, pH of the suspension was adjusted to a predetermined pH (pH 10) using a solution of 3% sodium hydroxide (pH adjusting step). The suspension was agitatied for 1 hour at the predetermined pH, and an impurity of the layered clay mineral powder was removed. Then, as the modifying agent, 25 mL of a sodium sulfate solution {0.01 M (synthesis example 1), 0.03 M (synthesis example 2), 0.05 M (synthesis example 3)} was added (modifying agent adding step), so that a spreading solution was obtained (preparing step).

The spreading solution was spread on a hydrophilic membrane filter which was made of PTFE and had a diameter of 47 mm (spreading step), and then was dried at room temperature for 48 hours. As a result, a membrane was obtained. Then, the obtained membrane was subjected to heat treatment at the temperature of 60° C. for 3 hours, and a reaction completely proceeded (removing step). The membrane subjected to heat treatment was fully cleaned with ultra pure water, and then was dried. As a result, a proton conductive membrane having a diameter of 47 mm and a thickness of 50 µm was obtained.

Synthesis Examples 4 to 6

In 1.6 g of absolute ethanol, 1 g of tungstosilicic acid which was subjected to a drying treatment at 70° C. for 24 hours was dissolved, and a solution was obtained. In the solution, 0.2 g of hydrotalcite is dispersed by the ultrasonic homogenizer, and a homogenous suspension was obtained. The suspension was left at room temperature for 7 days (immersing step).

Subsequently, a deposit was cleaned with a large amount of absolute ethanol, and excess tungstosilicic acid was removed. Then, drying is performed at 70° C. for 24 hours, and powder was obtained. The obtained powder was added in 25 mL of a solution of orthophosphoric acid {0.01 M (synthesis example 4), 0.03 M (synthesis example 5), 0.05 M (synthesis example 6)} as the modifying agent, and the powder was dispersed in the solution of orthophosphoric acid by the ultrasonic homogenizer. As a result, a homogenous solution was obtained as a spreading solution (preparing step).

The spreading solution was spread on a hydrophilic membrane filter which was made of PTFE and had a diameter of 47 mm (spreading step), and then was dried at room temperature for 7 days (removing step). As a result, a membrane was obtained. The membrane was fully cleaned with ultra pure water, and then was dried. As a result, a proton conductive membrane having a diameter of 47 mm and a thickness of 50 µm was obtained. The proton conductive membrane was dried in an atmosphere in which the temperature was 25° C., and relative humidity was 50% for 3 days. Then, the membrane was dried at 60° C. for 3 to 12 hours so as to be formed.

[Measurement of Hydrogen Permeability Coefficient]

A hydrogen permeability coefficient was calculated by an isobaric method according to JIS K7126. A permeation cell area had a diameter of 20 mm, and the measurement was performed at room temperature. More specifically, a cell temperature was 80° C., and a gas flow amount was 300 mL/minute. Hydrogen was supplied to one electrode, and argon was supplied to the other electrode at 2 atmospheric pressure. The relative humidity of the supplied gases was switched so as to be 90% or 0%. An amount of hydrogen that permeates through the obtained proton conductive membrane to the electrode to which argon was supplied was measured by gas chromatography. Results are shown in Table 1.

[Measurement of Proton Conductivity]

The proton conductivity was measured by an impedance method. More particularly, the proton conductive membrane was sandwiched between platinum electrodes in a membrane thickness direction in a tank in which the temperature and humidity were adjusted so as to be constant (the temperature was 80° C., and the relative humidity is shown in Table 1). The measurement was performed by a four-terminal method. AC frequency was in a range of 10 kHz to 50 MHz. Results are shown in Table 1.

TABLE 1

| | Sodium sulfate | Ortho-phosphoric acid | Hydrogen permeability coefficient ($\times 10^{-9}$ cm$^3$cm$^{-1}$S$^{-1}$cmHg$^{-1}$) | | Proton conductivity ($\times 10^{-3}$ S/cm) | |
|---|---|---|---|---|---|---|
| | | | DRY (0 RH %) | WET (90 RH %) | DRY (30 RH %) | WET (90 RH %) |
| Ex. 1 | 0.01 M | — | 8.0 | $2.8 \times 10$ | 1.2 | 9.0 |
| Ex. 2 | 0.03 M | — | 1.8 | 8.2 | 1.4 | $1.2 \times 10$ |
| Ex. 3 | 0.05 M | — | 7.9 | $2.7 \times 10$ | 1.5 | $1.4 \times 10$ |
| Ex. 4 | — | 0.01 M | 7.3 | $4.0 \times 10$ | 8.3 | $4.6 \times 10$ |
| Ex. 5 | — | 0.03 M | 3.8 | $3.3 \times 10$ | $1.3 \times 10$ | $5.6 \times 10$ |
| Ex. 6 | — | 0.05 M | 2.1 | $1.4 \times 10$ | 6.6 | $2.2 \times 10$ |
| Nafion | — | — | $1.7 \times 10$ | $8.5 \times 10^3$ | $1.8 \times 10$ | $8.7 \times 10$ |

As apparent from Table 1, the hydrogen permeability coefficient did not vary greatly when a dry condition was changed to a wet condition, irrespective of the amount of added sodium sulfate or orthophosphoric acid (the hydrogen permeability coefficient increased by 10 times at most). On the other hand, the hydrogen permeability of Nafion increased by 400 times at least when the dry condition was changed to the wet condition. Therefore, it is supposed that the proton conductive membrane according to the embodiment does not swell greatly due to moisture. It is also considered that a distance between molecules is not increased due to moisture, and thus the hydrogen permeability coefficient is not increased due to moisture.

Among the synthesis examples 1 to 3, the hydrogen permeability coefficient of the synthesis example 2 in which the concentration of the sodium sulfate solution was 0.03 M is lowest. It is considered that the amount of added sodium sulfate was an amount at which the crosslinking occurs easily with respect to the number of the acid sites on the surfaces of the particles of the layered clay mineral powder.

What is claimed is:

1. A proton conductive membrane comprising:
   layered clay mineral powder which is a cation exchanger or an anion exchanger; and
   a first crosslinking structure including an —O—SO$_2$—O— group which crosslinks particles of the layered clay mineral powder;
   wherein the layered clay mineral powder is the anion exchanger, and an acid has been inserted between layers of the particles of the layered clay mineral powder.

2. The proton conductive membrane according to claim 1, wherein particles of the layered clay mineral powder have an acid site on a surface thereof, and the layered clay mineral powder in the proton conductive membrane has been applied by a modifying agent which contains one or more compounds selected from the group consisting of sulfuric acid and metal sulfates.

3. The proton conductive membrane according to claim 1, wherein a sulfo group exists on a surface of the particle of the layered clay mineral powder.

4. The proton conductive membrane according to claim 1, wherein the acid is tungstosilicic acid.

5. The proton conductive membrane according to claim 1, wherein the proton conductive membrane comprises a second crosslinking structure obtained by crosslinking the particles of the layered clay mineral powder using at least one of phosphoric acid and a compound containing a phosphate group.

6. A production method of a proton conductive membrane, comprising:
   a preparing step of a preparing a spreading solution including layered clay mineral powder which is a cation exchanger or an anion exchanger and a modifying agent which contains one or more compounds selected from the group consisting of sulfuric acid and metal sulfates;
   a spreading step of spreading the spreading solution on a substrate such that a liquid membrane is formed; and
   a removing step of removing a solvent from the liquid membrane by drying;
   wherein the preparing step includes a step of dispersing the layered clay mineral powder in the solvent such that a solution is obtained, and then adjusting pH of the solution to a predetermined pH, and a step of adding the modifying agent to the solution.

7. The production method according to claim 6, wherein the production method includes an inserting step of inserting an acid between layers of the particle of the layered clay mineral powder by immersing the layered clay mineral powder in an acid solution before the preparing step.

8. The production method according to claim 6, wherein an acid site which reacts with at least one of the sulfuric acid and the metal sulfate exists on a surface of the particle of the layered clay mineral powder, the spreading liquid is obtained by mixing the at least one of the sulfuric acid and the metal sulfate and the layered clay mineral powder so that a sulfo group is introduced to the surface of the particle of the layered clay mineral powder in the preparing step, and amount of the at least one of the sulfuric acid and the metal sulfate is excessive as compared with the number of the acid sites of the particles of the layered clay mineral powder.

9. A production method of a proton conductive membrane comprising:
- a preparing step of a preparing a spreading solution including layered clay mineral powder which is a cation exchanger or an anion exchanger and a modifying agent which contains one or more compounds selected from the group consisting of sulfuric acid and metal sulfates;
- a spreading step of spreading the spreading solution on a substrate such that a liquid membrane is formed;
- a removing step of removing a solvent from the liquid membrane by drying; and
- an inserting step of inserting an acid between layers of the particle of the layered clay mineral powder by immersing the layered clay mineral powder in an acid solution before the preparing step;

wherein the acid is tungstosilicic acid.

10. A production method of a proton conductive membrane comprising:
- a preparing step of a preparing a spreading solution including layered clay mineral powder which is a cation exchanger or an anion exchanger and a modifying agent which contains one or more compounds selected from the group consisting of sulfuric acid and metal sulfates;
- a spreading step of spreading the spreading solution on a substrate such that a liquid membrane is formed;
- a removing step of removing a solvent from the liquid membrane by drying; and
- an inserting step of inserting an acid between layers of the particle of the layered clay mineral powder by immersing the layered clay mineral powder in an acid solution before the preparing step;

wherein the acid solution is a nonaqueous solvent solution of the acid.

11. A production method of a proton conductive membrane, comprising:
- a preparing step of a preparing a spreading solution including layered clay mineral powder which is a cation exchanger or an anion exchanger and a modifying agent which contains one or more compounds selected from the group consisting of sulfuric acid and metal sulfates;
- a spreading step of spreading the spreading solution on a substrate such that a liquid membrane is formed;
- a removing step of removing a solvent from the liquid membrane by drying; and
- an inserting step of inserting an acid between layers of the particle of the layered clay mineral powder by immersing the layered clay mineral powder in an acid solution before the preparing step;

wherein the modifying agent contains at least one of phosphoric acid and a compound containing a phosphate group.

* * * * *